US012634395B2

(12) United States Patent
Bhattacharjee et al.

(10) Patent No.: US 12,634,395 B2
(45) Date of Patent: May 19, 2026

(54) ROUTING OF COMMUNICATIONS TO CONTACT CENTER AGENTS USING MACHINE LEARNING

(71) Applicant: Cisco Technology, Inc., San Jose, CA (US)

(72) Inventors: Arunabh Bhattacharjee, Etobicoke (CA); Aseem Banshidhar Asthana, Morgan Hill, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 79 days.

(21) Appl. No.: 18/358,475

(22) Filed: Jul. 25, 2023

(65) Prior Publication Data

US 2025/0039303 A1     Jan. 30, 2025

(51) Int. Cl.
| | |
|---|---|
| *H04M 3/00* | (2024.01) |
| *H04M 3/51* | (2006.01) |
| *H04M 3/523* | (2006.01) |

(52) U.S. Cl.
CPC ....... *H04M 3/5233* (2013.01); *H04M 3/5175* (2013.01); *H04M 2203/401* (2013.01)

(58) Field of Classification Search
CPC .......................... H04M 3/5233; H04M 3/5175
See application file for complete search history.

(56) References Cited

U.S. PATENT DOCUMENTS

| | | | |
|---|---|---|---|
| 8,948,370 B2 * | 2/2015 | Wawrzynowicz | ...... G06F 40/18 |
| | | | 379/272 |
| 9,160,858 B2 | 10/2015 | Khouri et al. | |
| 11,190,643 B1 | 11/2021 | Sanghvi et al. | |
| 11,636,360 B1 * | 4/2023 | Mishra | ............... H04M 3/5166 |
| | | | 706/12 |
| 2017/0111507 A1 | 4/2017 | McGann et al. | |
| 2019/0188604 A1 * | 6/2019 | Amitava | ............... G06N 20/00 |
| 2020/0293922 A1 | 9/2020 | Moody, III et al. | |
| 2020/0374398 A1 | 11/2020 | Sharma et al. | |
| 2022/0044115 A1 | 2/2022 | Milman et al. | |
| 2024/0330828 A1 * | 10/2024 | Pat | ................... G06Q 10/06311 |

OTHER PUBLICATIONS

Alvaria, "Skills-Based Routing," Glossary, retrieved from https://www.alvaria.com/glossary/what-is-skills-based-routing, Jul. 12, 2023, 1 page.
Lariviere, M., "Affinity-based routing and call center performance," https://operationsroom.wordpress.com/2011/02/28/affinity-based-routing-and-call-center-performance/, Feb. 28, 2011, 4 pages.

* cited by examiner

*Primary Examiner* — Rasha S Al Aubaidi
(74) *Attorney, Agent, or Firm* — Edell, Shapiro & Finnan, LLC

(57) ABSTRACT

In one example embodiment, one or more machine learning models of at least one processor determine an agent of a communication center to receive a communication from a user according to one or more objectives that optimize a corresponding metric from interaction of the user and the agent. Features for training the one or more machine learning models are dynamically selected based on relevance of the features to attaining the one or more objectives. The at least one processor routes the communication to the agent of the communication center.

20 Claims, 10 Drawing Sheets

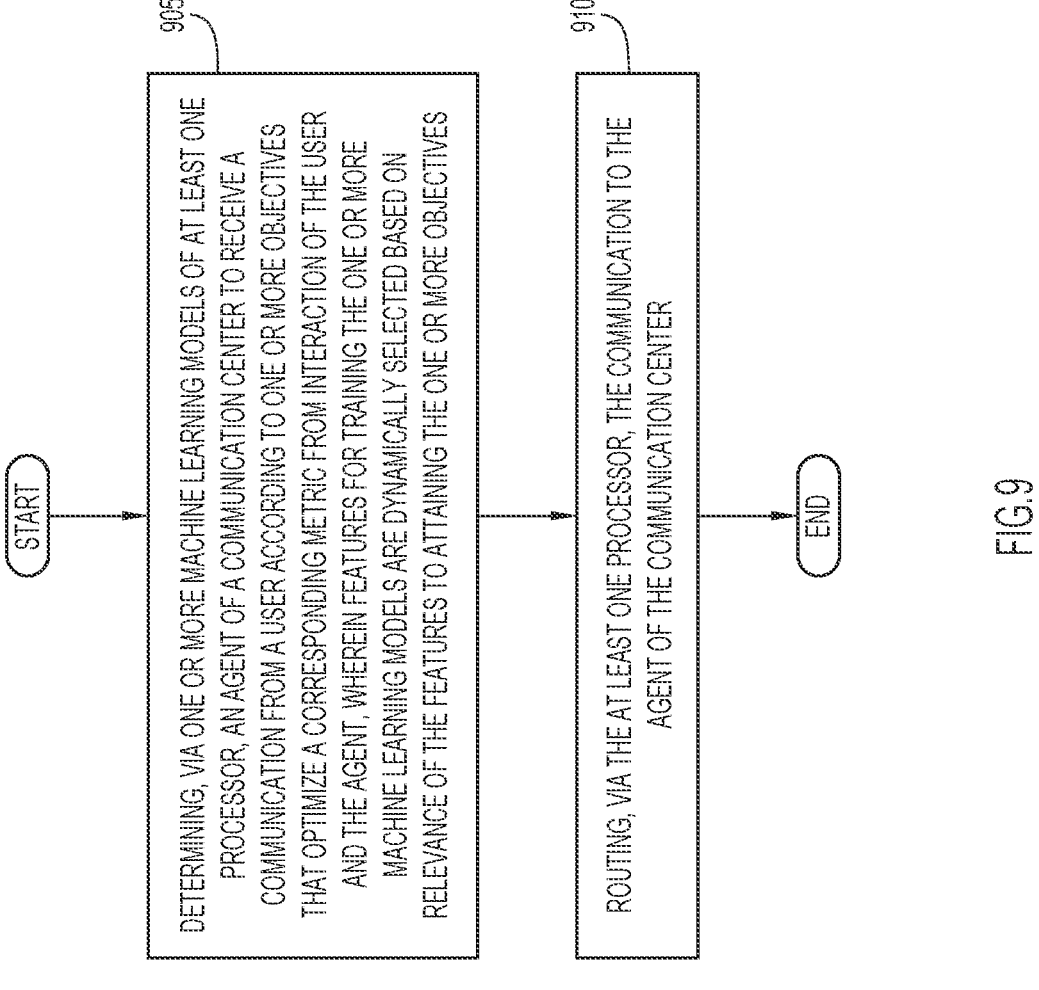

START

905

DETERMINING, VIA ONE OR MORE MACHINE LEARNING MODELS OF AT LEAST ONE PROCESSOR, AN AGENT OF A COMMUNICATION CENTER TO RECEIVE A COMMUNICATION FROM A USER ACCORDING TO ONE OR MORE OBJECTIVES THAT OPTIMIZE A CORRESPONDING METRIC FROM INTERACTION OF THE USER AND THE AGENT, WHEREIN FEATURES FOR TRAINING THE ONE OR MORE MACHINE LEARNING MODELS ARE DYNAMICALLY SELECTED BASED ON RELEVANCE OF THE FEATURES TO ATTAINING THE ONE OR MORE OBJECTIVES

910

ROUTING, VIA THE AT LEAST ONE PROCESSOR, THE COMMUNICATION TO THE AGENT OF THE COMMUNICATION CENTER

END

ROUTING OF COMMUNICATIONS TO CONTACT CENTER AGENTS USING MACHINE LEARNING

TECHNICAL FIELD

The present disclosure relates to communication routing.

BACKGROUND

A customer may call a contact center to communicate with a human agent of the contact center for assistance with respect to a product or service. Selection of the contact center agent is static in nature. Skills and/or attributes are defined on an agent level, and new customer calls that are to be routed are assigned skill attributes. These configurations on the agent and customer call selection level are static and configured by an administrator. Selection of a contact center agent considers these skills and/or attributes with respect to the customer (or call) and matches the call with the contact center agent using a static configuration of queues. While this approach may be sufficient for specific situations, performance of the approach seldom considers historical data, customer experience data, dynamic feedback (outcome variables of the interaction), and dynamic parameters of a call based on the reason for the call. Traditional approaches do not scale due to the complexity of the rules to be implemented for routing. Static configuration of routing rules cannot scale adequately when the number of parameters is increased. For example, routing for the best business outcomes may be performed based on simultaneous consideration of agent skill, prior historical interaction (handle times), time of day, customer emotions, satisfaction scores, agent availability, location of the customer, language spoken by the customer, supervisor requirements (efficiency and capacity). Multiple static rules are not able to handle these types of complex scenarios.

BRIEF DESCRIPTION OF THE DRAWINGS

FIG. 9 illustrates a flowchart of a generalized method for routing communications, according to an example embodiment.

DETAILED DESCRIPTION

Overview

Figure 1:
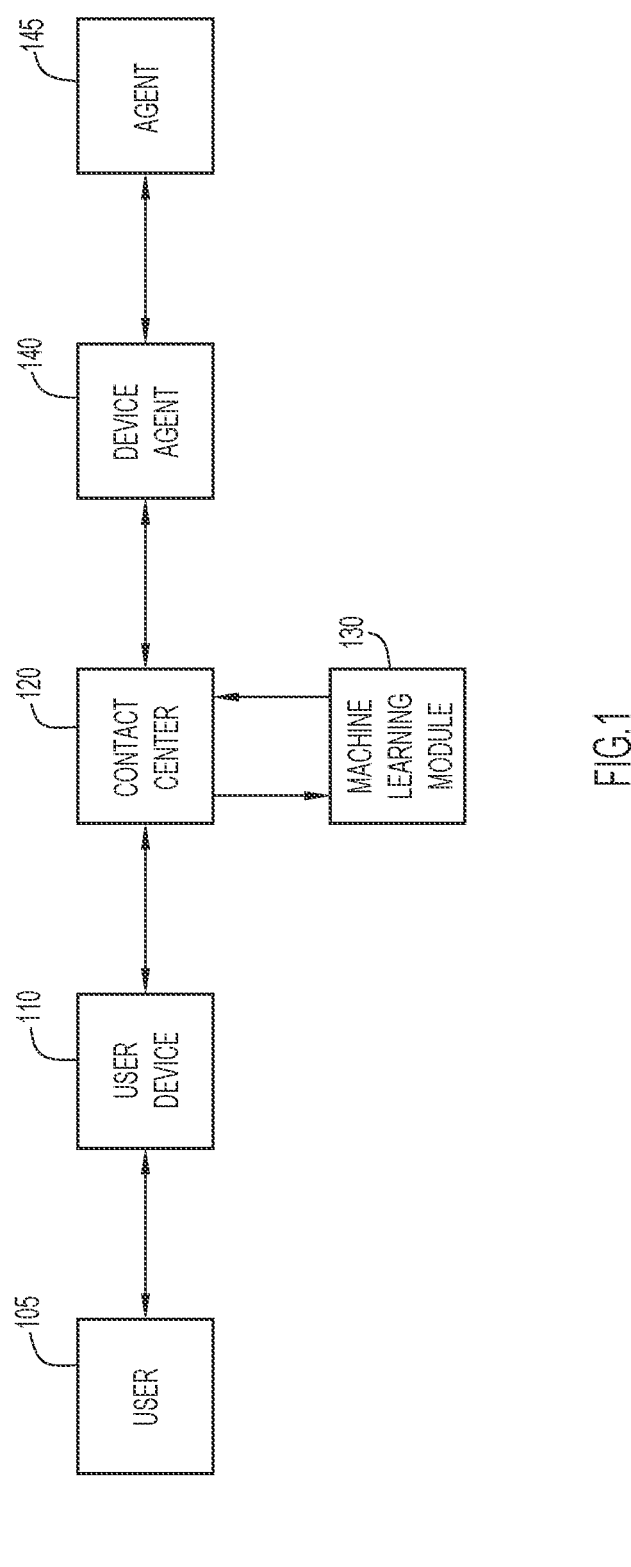
FIG. 1 is a block diagram of an example contact center environment in which routing of communications may be implemented, according to an example embodiment.

In one example embodiment, one or more machine learning models of at least one processor determine an agent of a communication center to receive a communication from a user according to one or more objectives that optimize a corresponding metric from interaction of the user and the agent. Features for training the one or more machine learning models are dynamically selected based on relevance of the features to attaining the one or more objectives. The at least one processor routes the communication to the agent of the communication center.

Example Embodiments

Selection of contact center agents for handling customer calls is limited since it relies on static configurations of skill attributes assigned to the contact center agents and to the customers or communications to be handled by the contact center agents. While this approach may be sufficient for some cases, the approach cannot scale to multiple scenarios and business outcomes due to complexity of rules for effective routing. Some example factors, such as agent skill, historical interaction data, time of day, customer emotions during a call, agent availability metrics, agent toxicity levels, customer location, language, and supervisor requirements (e.g., handle time, service level, interactive voice response (IVR) time) may be considered simultaneously for effective routing, and static rules are insufficient for handling these types of complex scenarios.

An example embodiment pertains to contact center agent selection for omni-channel interactions based on a growing set of dynamic parameters from prior customer interactions. Incoming communications (from human callers) are matched to logged in agents (human customer service or contact center agents) using a machine learning model (as opposed to static configurations). This dynamic matching is built on the a growing set of attributes from incoming communications that are assigned to contact center agents to build a dynamic agent selection map. The predictions are based on outcome variables for the contact center (e.g., experience, efficiency, productivity metrics, problem codes, etc.). The machine learning model learns continuously using newer data and supervised machine learning from agent, supervisor, and customer feedback after every interaction. Thus, the machine learning model is able to adapt to changes in communication distribution patterns. These patterns are personalized across every tenant, customer, and agent combination, thereby making the selection very accurate.

An example embodiment utilizes supervised machine learning using dynamic parameterization (e.g., features from outcomes of a history of communications) by tracking a large number of parameters per connected call and matching features on an agent level that are predictors of outcomes. Skill level parameters of an agent are altered based on success criteria of a resulting match. Data (e.g., attributes/features and routing results) is collected over a period of time and used to train a machine learning model to provide agent selection based on input and output parameters. This removes a restriction of a static set of features/configurations being used as input for routing. Further, continuous learning enables the machine learning model to dynamically learn newer mappings between customers and agents and remain updated. This is used to constantly/continuously change input parameters for the agents based on an outcome of an agent selection.

An example embodiment uses supervised machine learning. Data collected over time on completed interactions is used to train a machine learning model based on outcome variables, which removes the need for a static set of input features. Continuous learning enables the machine learning model to dynamically learn new mappings and remain updated, where these updates are also propagated to entities used in the initial machine learning model (by updating configurations).

While the present embodiments are described with respect to a contact center and identifying agents to handle incoming communications, it will be appreciated that the selection of agents may be performed for any type of communication center (e.g., contact center, support center, call center, etc.) or physical or virtual site to route incoming requests or communications. An agent may include any entity (e.g., person, bot, computerized agent, etc.) to handle the requests. Further, a communication may include any communication, request, and/or correspondence (e.g., audio, text, electronic, call, electronic mail, text message, etc.) from any mode of communication.

FIG. 1 illustrates a block diagram of an example contact center environment 100 in which an embodiment presented herein may be implemented. Environment 100 includes one or more user devices 110 operated by users 105, and a contact center 120 to support communication sessions (e.g., calls, chats, etc.) between the user devices and a corresponding agent device 140 operated by a contact center agent 145. The contact center routes user communications to agent devices 140 of contact center agents 145 that may provide various support to the users 105 with respect to any products or services (e.g., process requests, provide information, assist with use of a product or service, billing issues, etc.). User devices 110 and agent device 140 can take on a variety of forms, including a smartphone, tablet, laptop computer, desktop computer, video conference endpoint, corresponding accessories (e.g., headset, etc.), and the like.

The communication session may be conduced over any suitable communication networks. For example, the communication networks may include one or more wide area networks (WANs), such as the Internet, one or more local area networks (LANs), and/or cellular or other telephony networks. User devices 110 may communicate over the communication networks using a variety of known or hereafter developed communication protocols. For example, user devices 110, agent device 140, and contact center 120 may exchange Internet Protocol (IP) data packets, Realtime Transport Protocol (RTP) media packets (e.g., audio and video packets), and so on.

Contact center 120 matches users 105 to contact center agents 145 to handle user requests or communications. The contact center predicts a reason for a call by a user 105 (e.g., using source attributes, such as customer/user attributes, historical data of customer/user, data collection at a self-service unit, etc.), selects a best agent 145 (e.g., based on sink attributes) to handle the call, and routes the call to the selected agent. A best agent may be determined based on a most skilled agent, optimization of metrics (e.g., agent efficacy, contact efficacy or handle times), and/or optimization of customer experience metrics or outcomes (e.g., customer satisfaction score (CSAT) indicating customer satisfaction and based on a customer provided rating, net promoter score (NPS) indicating customer loyalty and based on a customer provided rating, customer effort score (CES) indicating effort by a customer to interact with an organization and indicated by a customer rating, post-call sentiment, call reasons, etc.). A result of the interaction between the user and selected agent (e.g., customer satisfaction, call metrics, etc.) is fed back for a next prediction of an agent for a user.

Contact center 120 further includes a machine learning (ML) module 130 to select a contact center agent for an incoming communication as described below. This enables an example embodiment to transition to dynamic routing (as opposed to rule-based approaches). Multiple attributes or features may be used as inputs for setting up a routing module or engine. The attributes may include user/customer attributes, user/customer efficacy metrics, agent efficacy metrics, and/or business variables. The machine learning model predicts the best agents based on specific outcome variables. The machine learning model can be trained for multiple outcomes or objectives (e.g., select an agent based on optimizing a customer satisfaction score (CSAT), a net promoter score (NPS), a customer effort score (CES), handle times, a service level, a match to agent skill, a match for a call reason, etc.). A feedback mechanism may be used to obtain information for an outcome of an interaction from customers, agents, and/or supervisors. Continuous learning may be performed at a tenant level to improve performance over a period of time.

Initially, a communication or request is received by contact center 120 from user 105 via user device 110. The contact center requests machine learning module 130 to identify the best agent to handle the request for given objectives (e.g., select the agent that optimizes a customer satisfaction score (CSAT), net promoter score (NPS), customer effort score (CES), etc.). Machine learning module 130 provides the contact center with a list of contact center agents based on the objectives, and the contact center routes the request to an agent device 140 of an agent 145 based on priority within the list and agent availability.

Figure 2:
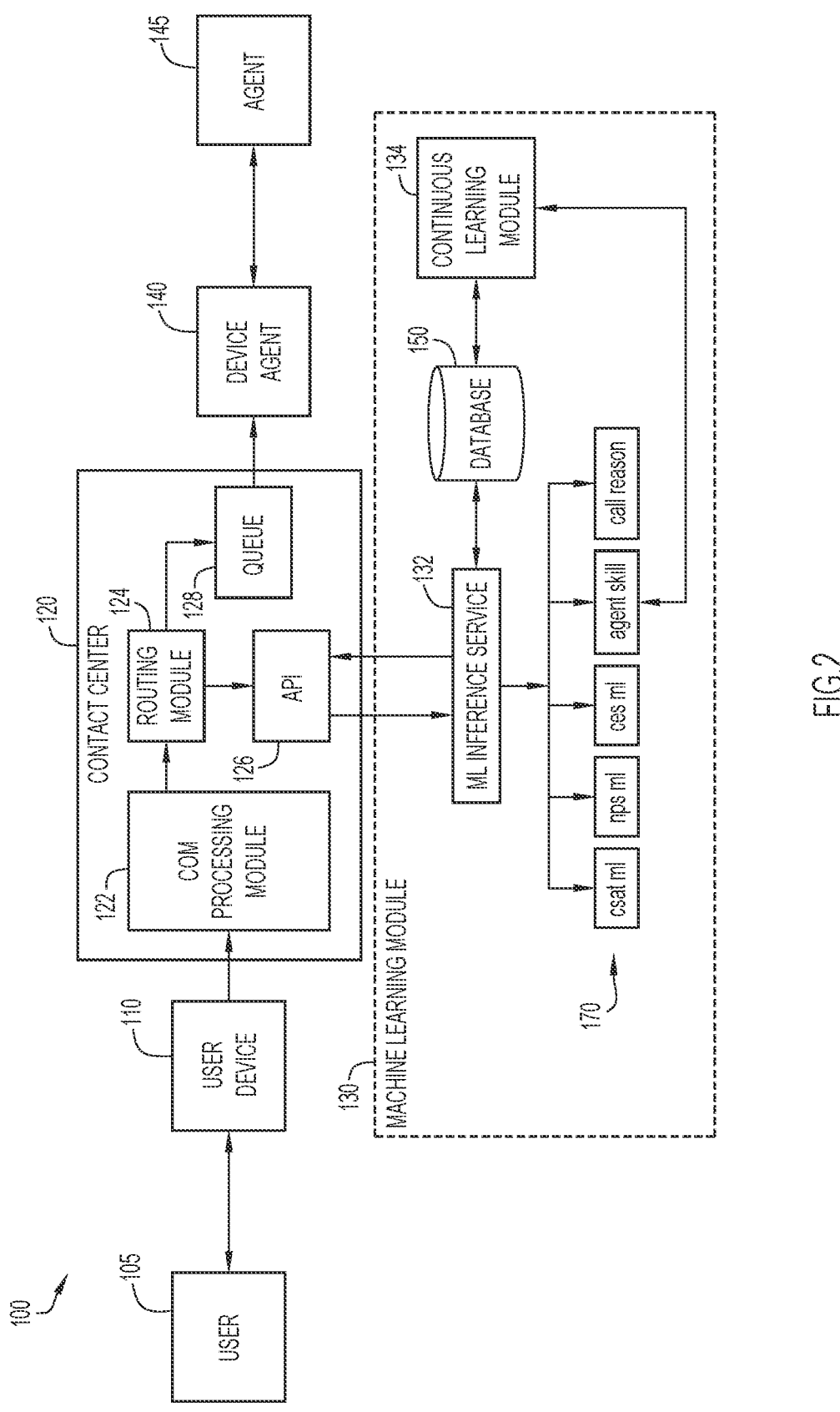
FIG. 2 is a block diagram of the contact center environment of FIG. 1 with further details of routing communications, according to an example embodiment.

Referring to FIG. 2, contact center 120 includes a communication processing module 122, a routing module 124, an application programming interface (API) 126, and a communication queue 128 to hold communications for routing. Communication processing module 122 initially receives a communication from user 105 via user device 110 (e.g., a call, etc.). The communication processing module may obtain information about the user and/or communication. For example, the communication processing module may enable interaction with a user (e.g., via an interactive voice response (IVR) system, etc.), or analyze text of messages to obtain information (e.g. reason for the communication, user information, etc.). The information is provided to routing module 124 to route the communication from queue 128 to a contact center agent 145 that can handle the communication. The routing module directs API 126 to send a request to machine learning module 130. The API may include a Representational State Transfer (REST) API that makes a REST API call to the machine learning module. However, any type of API or protocol may be used.

Machine learning module 130 may be included within, or reside on a remote computer system coupled to, contact center 120. The machine learning module includes a machine learning (ML) inference service 132, a continuous learning module 134, and a series of machine learning models 170. The machine learning models are each trained for selecting an agent based on optimizing a corresponding objective or outcome. By way of example, machine learning models 170 may include a machine learning model for each corresponding objective or outcome of customer satisfaction score (CSAT), net promoter score (NPS), customer effort score (CES), agent skill, and call reason. In other words, a machine learning model selects an agent 145 that produces an optimal score for a corresponding objective from an interaction between the selected agent and user (e.g., an optimal CSAT, NPS, CES, match to agent skill, match to the call reason, etc.). However, any quantity of machine learning models may be used corresponding to any quantity of any desired objectives. The machine learning inference service processes the API request and retrieves information of a corresponding machine learning model from a database 150 based on user and other information in the API request (e.g., objective, etc.). The corresponding machine learning model produces a list of agents to handle the request. The agents may be ordered or prioritized in the list based on a confidence or probability of the agent produced by the corresponding machine learning model.

Machine learning models 170 may include any conventional or other machine learning models (e.g., mathematical/statistical, logistic regression, classifiers (e.g., random forest, gradient boosting, linear support vector classifier (SVC), Multinomial Naive Bayes (MNB), etc.), feed-forward, recurrent, convolutional, deep learning, or other neural networks, etc.). By way of example, a neural network may be employed for agent selection. For example, neural networks may include an input layer, one or more intermediate layers (e.g., including any hidden layers), and an output layer. Each layer includes one or more neurons, where the input layer neurons receive input (e.g., text or text features, etc.), and may be associated with weight values. The neurons of the intermediate and output layers are connected to one or more neurons of a preceding layer, and receive as input the output of a connected neuron of the preceding layer. Each connection is associated with a weight value, and each neuron produces an output based on a weighted combination of the inputs to that neuron. The output of a neuron may further be based on a bias value for certain types of neural networks (e.g., recurrent types of neural networks).

The weight (and bias) values may be adjusted based on various training techniques. For example, the machine learning of the neural network may be performed using a training set of various features as input and corresponding known outputs (e.g., agents that optimize the corresponding objective), where the neural network attempts to produce the known output and uses an error from the output (e.g., difference between produced and known outputs) to adjust weight (and bias) values (e.g., via backpropagation or other training techniques).

The output layer neurons may indicate a probability for the input data being associated with a corresponding output (e.g., an agent). The output with the highest probabilities may be selected as the agents for the list. The list may include any desired quantity of agents.

Routing module 124 of contact center 120 receives the list of agents determined by the corresponding machine learning model from machine learning inference service 132 and routes the communication from queue 128 to an agent device 140 of an agent 145 based on priority within the list and agent availability (e.g., an available agent with a highest priority in the list, etc.). The agent device enables communication between agent 145 and corresponding user 105. Continuous learning module 134 continuously trains machine learning models 170 based on historical data (e.g., from post contact/interaction data, customer experience data sources, customer relationship management (CRM) systems, etc.). Further, various feedback may be provided for training (e.g., human feedback, feedback from contact metrics and experience sources, etc.). The continuous learning module updates or replaces a current machine learning model with the newly trained machine learning model based on improved accuracy.

Figure 6:
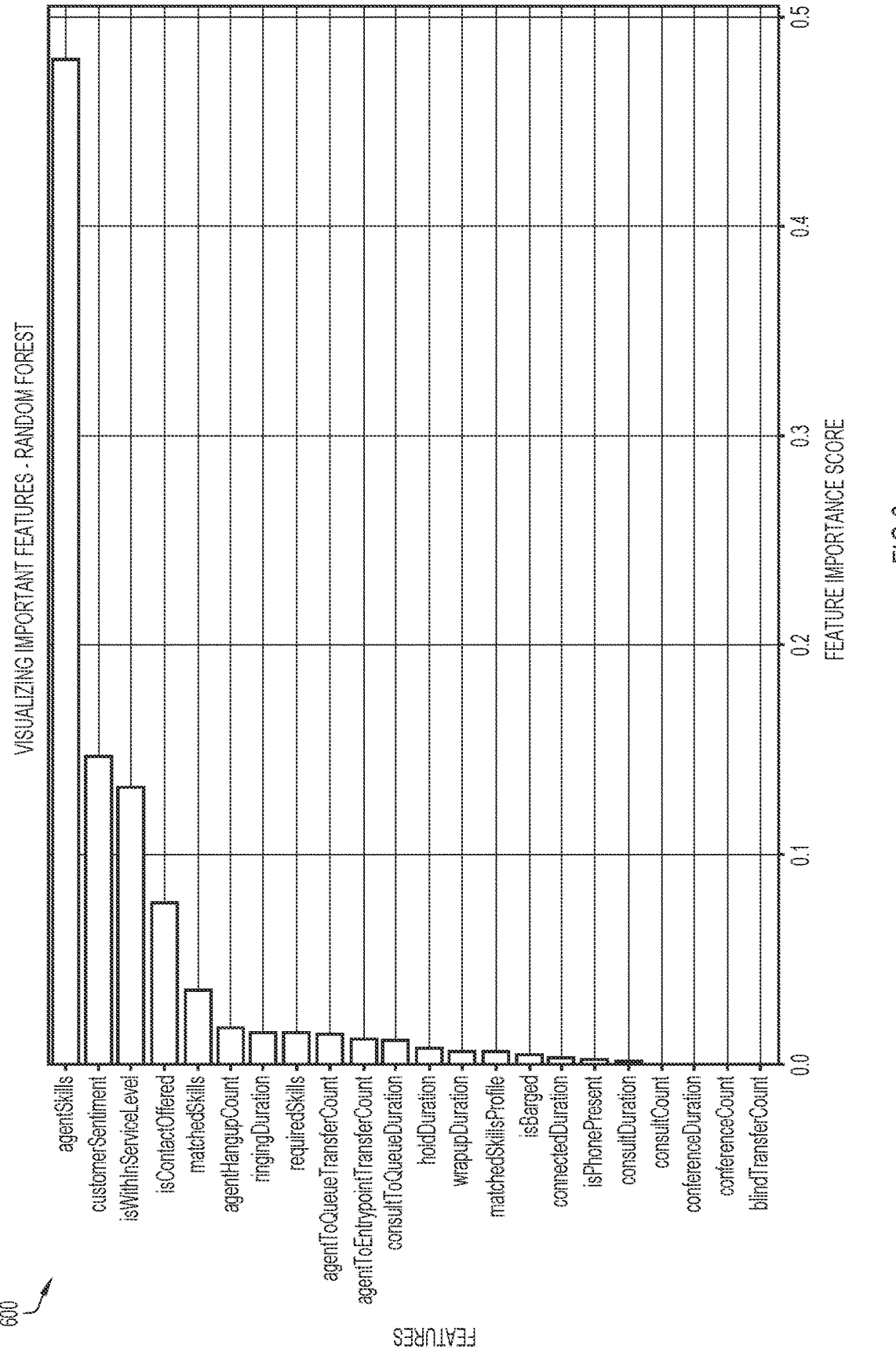
FIG. 6 illustrates a graphical representation of importance of features for attaining a desired objective, according to an example embodiment.
Figure 7:
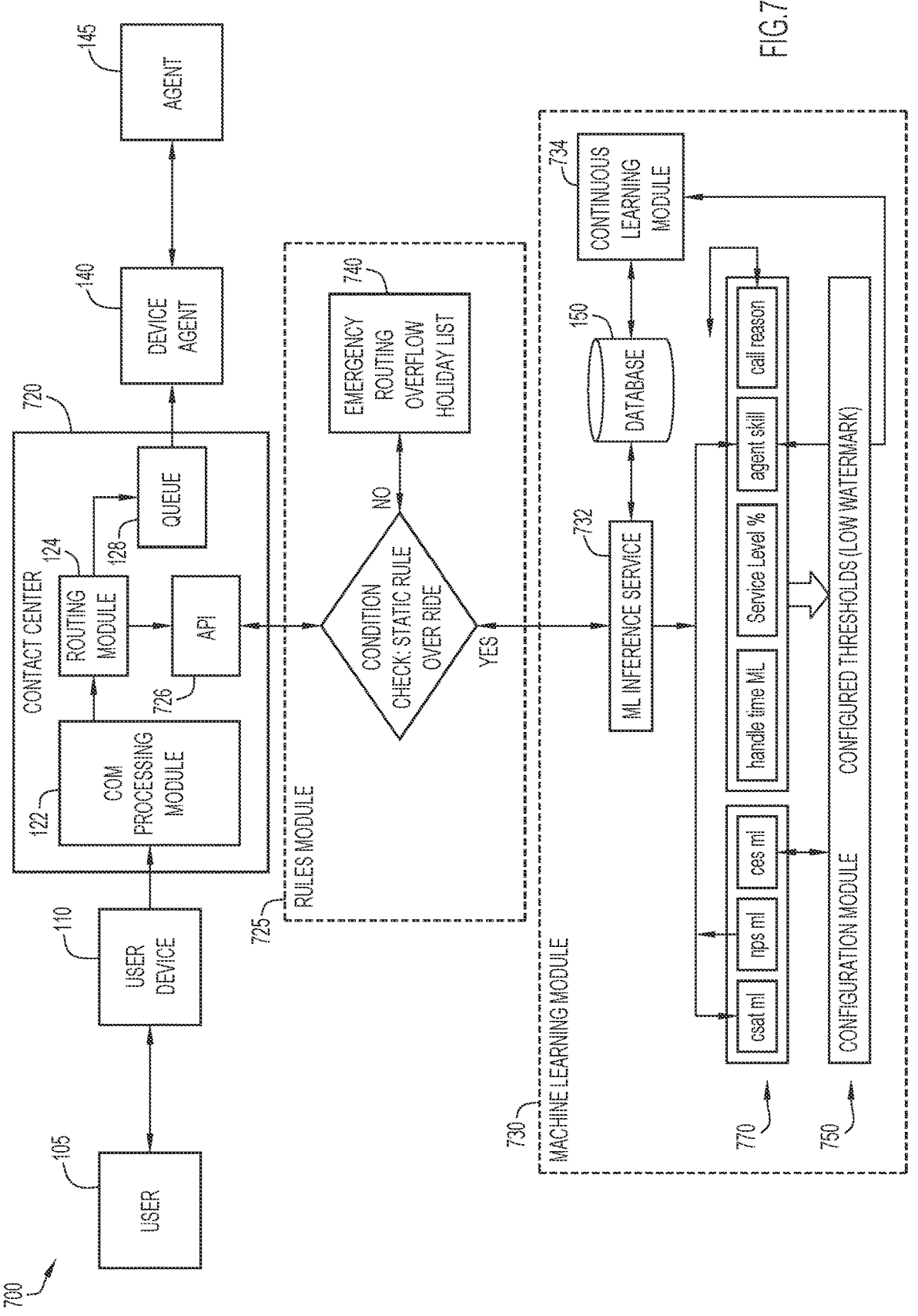
FIG. 7 is a block diagram of a contact center environment for routing communications based on plural objectives, according to an example embodiment.
Figure 8:
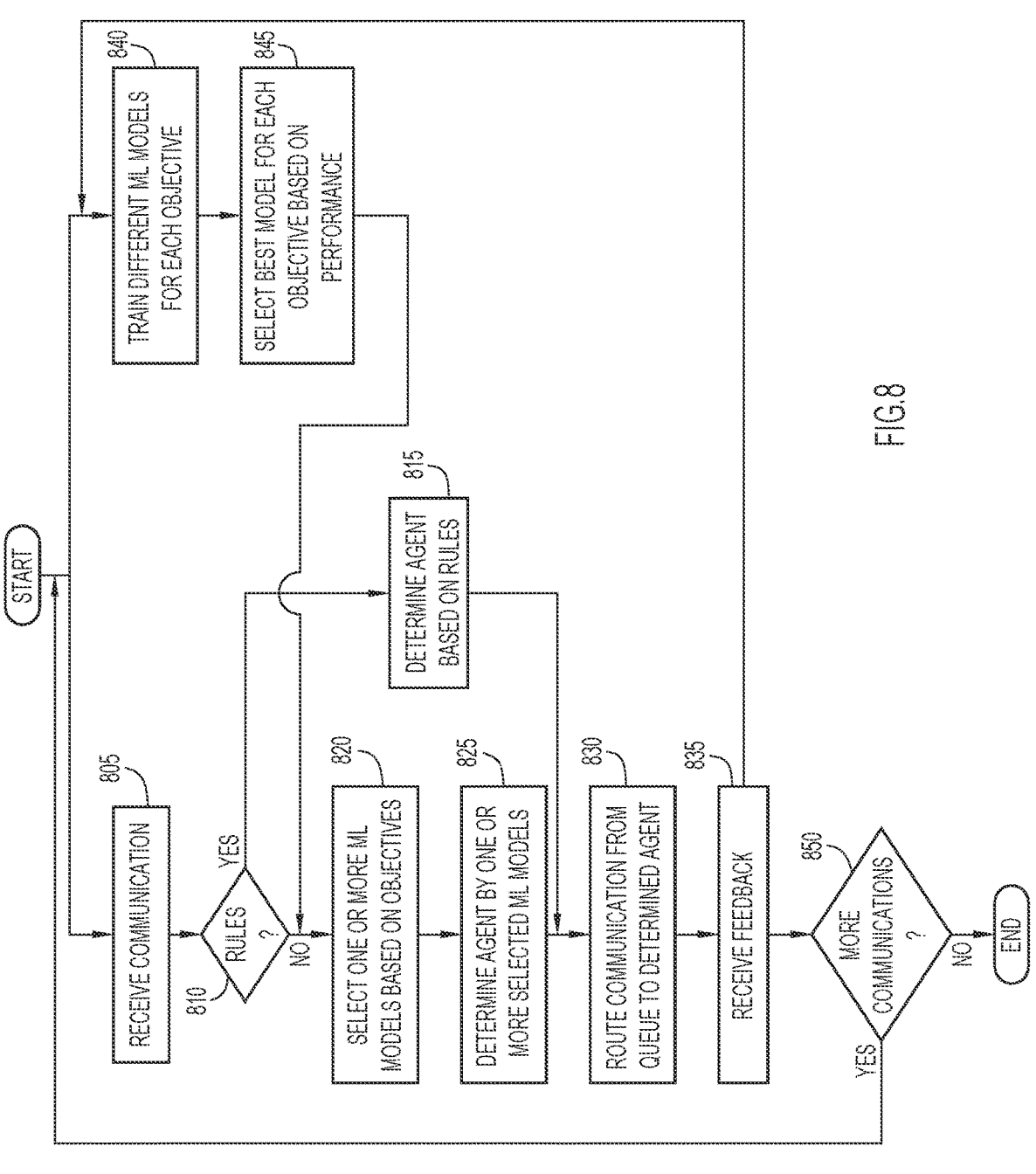
FIG. 8 is a flowchart of a method for routing communications based on plural objectives, according to an example embodiment.

Further, continuous learning module 134 may determine the features with highest relevance for predicting or attaining an outcome or objective to be used for the machine learning models (e.g., for training, for determining an agent, etc.). The relevance may be determined from historical data (e.g., interactions and outcomes, etc.) as described below (FIG. 6). The features may be monitored over time based on historical data and new interactions to dynamically and continuously adjust the feature set used for machine learning models 170 (e.g., for training, for determining an agent, etc.).

In addition, continuous learning module 134 may continuously update agent attributes (e.g., skill, toxicity, burnout scores, etc.) using machine learning model accuracy. In this case, the machine learning model involves a threshold level of completed matches to accurately provide a recommendation for an update.

Figure 3:
FIG. 3 is a flowchart of a method for routing communications to an agent of a contact center based on machine learning, according to an example embodiment.
Figure 4:
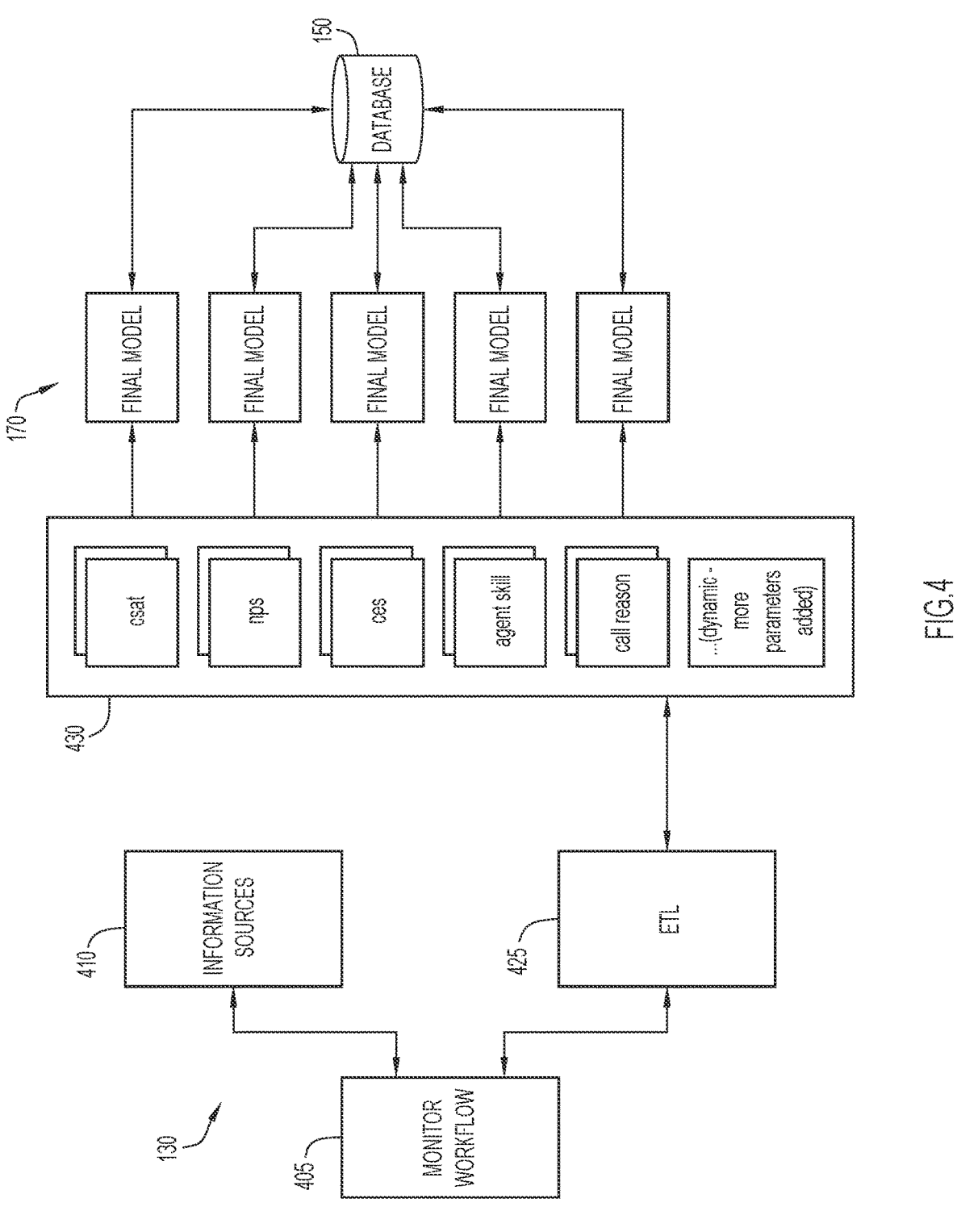
FIG. 4 is a flow diagram of a method for generating machine learning models for selection of a contact center agent, according to an example embodiment.

With continued reference to FIGS. 1 and 2, FIG. 3 illustrates a flowchart of a method 300 for routing communications to an agent of a contact center based on machine learning according to an example embodiment. Initially, contact center 120 receives a communication from a user 105 via user device 110 (e.g., a call, etc.) at operation 305. The communication is processed to obtain information about the user and/or communication, and may be provided to queue 128. For example, communication processing module 122 may enable interaction with a user (e.g., via an interactive voice response (IVR) system, etc.), or analyze text of messages to obtain information (e.g. reason for the communication, user information, etc.). The information is provided to routing module 124 that directs API 126 to send a request to machine learning module 130.

Machine learning module 130 includes a series of machine learning models 170 each trained for selecting an agent based on optimizing a corresponding objective (e.g., CSAT, NPS, CES, etc.). Machine learning inference service 132 of the machine learning module identifies a machine learning model for selection of agents based on user and other information in the API request (e.g., objective, etc.) at operation 310. The information for the identified machine learning model is retrieved from database 150, and the machine learning inference service provides a corresponding feature set to the identified machine learning model that produces a list of agents to handle the request at operation 315. In other words, the identified machine learning model selects agents that produce an optimal score for the requested objective from an interaction between the selected agent and user (e.g., an optimal CSAT, NPS, CES, match to agent skill, match to the call reason, etc.). The agents may be ordered or prioritized in the list based on a confidence or probability of the agent produced by the identified machine learning model.

Routing module 124 of contact center 120 receives the list of agents determined by the identified machine learning model from machine learning inference service 132, and routes the communication from queue 128 to an agent device 140 of an agent 145 based on priority within the list and agent availability at operation 320 (e.g., an available agent with the highest priority in the list, etc.). The agent device may enable communication between agent 145 and corresponding user 105. Once the interaction between the agent and corresponding user is completed, feedback may be received pertaining to the interaction at operation 325. The feedback may include agent, supervisor, and customer feedback (e.g., customer satisfaction/loyalty/effort scores or ratings, call metrics, etc.). The feedback is provided to continuously train machine learning models 170 (at operation 330).

Continuous learning module 134 of machine learning module 130 continuously updates and/or trains machine learning models 170. In particular, a series of different types of machine learning models may be generated, updated, and/or trained for each corresponding objective at operation 330 based on historical data (e.g., from post contact/interaction data, customer experience data sources, customer relationship management (CRM) systems, etc.). Further, various feedback may be provided for training (e.g., human feedback, feedback from contact metrics and experience sources, etc.).

Moreover, continuous learning module 134 may determine the features with highest relevance for predicting or attaining an outcome or objective to be used for the machine learning models (e.g., for training, for determining an agent, etc.). The relevance may be determined from historical data (e.g., interactions and outcomes, etc.) as described below (FIG. 6). The features may be monitored over time based on historical data and new interactions to dynamically and continuously adjust the feature set used for machine learning models 170 (e.g., for training, for determining an agent, etc.).

In addition, continuous learning module 134 may continuously update agent attributes (e.g., skill, toxicity, burnout scores, etc.) using the machine learning model accuracy. In this case, the machine learning model involves a threshold level of completed matches for an update.

Performance of the different types of machine learning models and a currently used machine learning model for the objectives are measured, and a newly trained machine learning model having greater accuracy updates or replaces the current machine learning model for a corresponding objective or attribute at operation 335. For example, when a current machine learning model for an objective experiences a reduction in performance or accuracy (e.g., indicating the current machine learning model may no longer be able to accommodate emerging patterns in the data, etc.), a newly trained machine learning model for the objective having greater accuracy may replace the current machine learning model. This enables the machine learning models to remain updated as new data patterns emerge (for selection at operation 310).

The above process repeats from operations 305 and 330 (e.g., the machine learning is performed continuously and during agent selection, etc.) until no further communications are present for processing as determined at operation 340.

With continued reference to FIGS. 1-3, FIG. 4 illustrates a flow diagram of a method 400 for generating machine learning models for selection of a contact center agent according to an example embodiment. Initially, a monitor workflow process 405 of machine learning module 130 monitors a workflow (e.g., for user agent interaction, etc.) and retrieves various information from information sources 410 for training machine learning models 170 (e.g., customer data, customer experience data (e.g., customer satisfaction score (CSAT), net promoter score (NPS), customer effort score (CES), etc.), contact center reporting information, customer sentiment, call and queue durations, customer metrics, agent metrics, etc.). An extract-transform-load (ETL) process 425 cleans, normalizes, and/or transforms the data to a format suitable for use by machine learning models 170.

Machine learning models 170 are each trained on a feature set by continuous learning module 134 for selecting an agent based on optimizing a corresponding objective 430 (e.g., customer satisfaction score (CSAT), net promoter score (NPS), customer effort score (CES), agent skill, call reason, etc.). In other words, a machine learning model is trained to select agents that produce an optimal score for an objective 430 from an interaction between the selected agent and user (e.g., an optimal CSAT, NPS, CES, match to agent skill, match to the call reason, etc.). The feature set is dynamic, where additional features may be added to enhance agent selection. The features of the feature set used for training and utilizing the machine learning models may be associated with users and agents, and may include identifiers, and input and output variables. The identifiers may be static, and include a customer identifier (e.g., caller number (e.g., from automatic number identification (ANI), etc.), email, etc.) and an agent identifier (e.g., agent Id, agent email, etc.). The input and output variables may be dynamic, and include historical customer sentiment (per interaction), historical agent handling metrics of the specific user (per interaction) (e.g., average handle time, average connected duration, average hold duration, etc.), prior satisfaction score analytics (per interaction) (e.g., customer satisfaction score (CSAT), net promoter score (NPS), customer effort score (CES), etc.), call metrics for match accuracy (per interaction) (e.g., number of transfer outs, number of blind transfers, number of consult transfers, etc.), agent skill (updated per model match prediction), current agent toxicity level (updated per model match prediction), customer location (per interaction), customer language spoken (per interaction), customer profile information (per interaction), supervisor requirements (per interaction) (e.g., service level percentage, queue time, agent capacity percentage, etc.), problem code/reason code/wrap up option (user entered), and/or agent effort score (user entered).

The feature set size and number of features or attributes used to train and utilize the model may be of any quantity. By way of example, the quantity of features may be on the order of several hundred or more features (e.g., at least one hundred features, etc.). In case of feature explosion, feature embeddings may be used to reduce input size, and embedding vectors may be processed by the machine learning models in place of direct features. The outcome of the training is a ranked list of target outputs (e.g., agents for the call, etc.) for a range of inputs identifying the customer. The accuracy of the matches would improve over time. Example embodiments provide dynamic routing and continuous learning based on a most appropriate match, as opposed to existing solutions that are static in nature.

A series of different types of machine learning models may be generated and trained by continuous learning module 134 for each objective 430 based on historical data (e.g., from post contact/interaction data, customer experience data sources, customer relationship management (CRM) systems, etc.). Further, various feedback may be provided for training (e.g., human feedback, feedback from contact metrics and experience sources, etc.). Performance of the different types of machine learning models and a currently used machine learning model are measured. A best machine learning model for each objective is selected based on testing results (e.g., greatest accuracy, etc.) and stored in database 150. The continuous learning module updates or replaces a current machine learning model for an objective 430 with a newly trained machine learning model based on improved accuracy. For example, a first portion (e.g., 50%-70%) of a data set may be used for training a machine learning model, a second smaller portion (e.g., 20%-30%) of a data set may used for validating the trained machine learning model, and a third smallest portion (e.g., 10%-20%) of the data set (with new data for the machine learning model) may be used to test the machine learning model and measure performance or accuracy. However, the portions may include any amount of the data set.

Moreover, continuous learning module 134 may determine the features with highest relevance for predicting or attaining an outcome or objective to be used for the machine learning models (e.g., for training, for determining an agent, etc.). The relevance may be determined from historical data (e.g., interactions and outcomes, etc.) as described below (FIG. 6). The features may be monitored over time based on historical data and new interactions to dynamically and continuously adjust the feature set used for machine learning models 170 (e.g., for training, for determining an agent, etc.).

In addition, continuous learning module 134 may continuously update agent attributes (e.g., skill, toxicity, burn-out scores, etc.) using machine learning model accuracy. In this case, the machine learning model involves a threshold level of completed matches for an update.

The stored machine learning models may be used based on the desired outcome or objective of a request. In addition, the machine learning models continuously learn, where different types of machine learning models may be used for an objective based on performance.

With continued reference to FIGS. 1-4, FIG. 5 illustrates a graphical plot 500 of accuracies of different types of machine learning models for selecting a contact center agent according to an example embodiment. Initially, plot 500 includes an X-axis indicating the different types of machine learning models and a Y-axis indicating accuracy values. By way of example, the machine learning models include a random forest classifier, a linear support vector classifier (SVC), Multinomial Naive Bayes, logistic regression, and a gradient boosting classifier. The machine learning models are trained to select an agent based on optimizing an objective 430. For example, the machine learning models are trained to select an agent based on optimizing a customer satisfaction score (CSAT). In other words, the machine learning model selects an agent that produces an optimal CSAT score from an interaction between the selected agent and user.

The machine learning models process a small set of sample data to determine accuracy. For example, a first portion (e.g., 50%-70%) of a data set may be used for training a machine learning model, a second smaller portion (e.g., 20%-30%) of a data set may used for validating the trained machine learning model, and a third smallest portion (e.g., 10%-20%) of the data set (with new data for the machine learning model) may be used to test the machine learning model and measure performance or accuracy. This helps to understand the predictor features for best matches (e.g., customer to agent).

Figure 5:
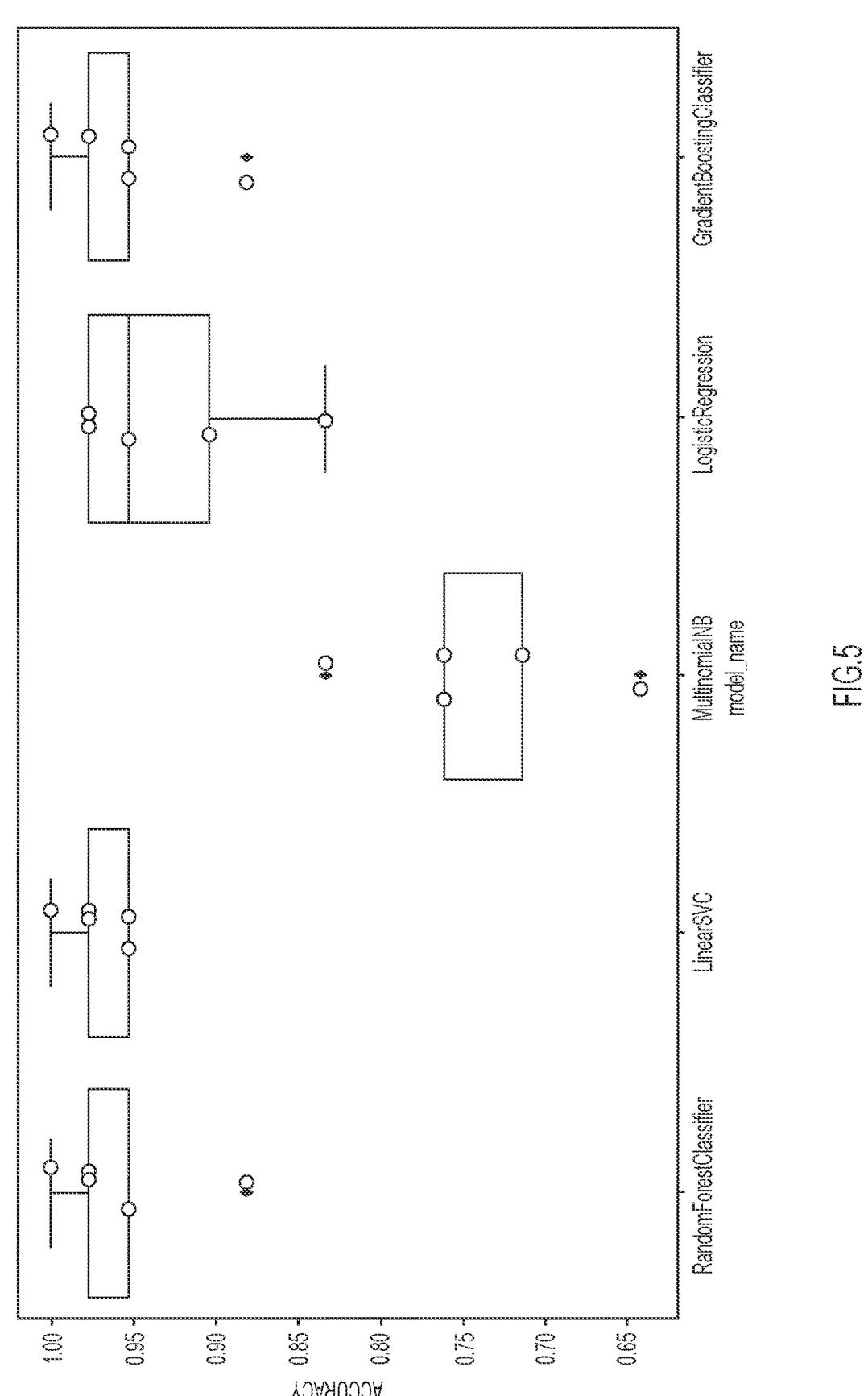
FIG. 5 illustrates a graphical representation of accuracies of different types of machine learning models for selecting a contact center agent, according to an example embodiment.

In the example of FIG. 5, the random forest classifier appears to provide the best performance with an accuracy of approximately 96%, and may be used for agent selection for the corresponding objective (e.g., optimizing CSAT). However, as machine learning continues, a different model may be selected as a current model to use for agent selection.

Thus, the most accurate machine learning models for each objective are used for agent selection to improve accuracy.

With continued reference to FIGS. 1-5, FIG. 6 illustrates a graphical plot 600 of importance of features for predicting or attaining a desired objective according to an example embodiment. Initially, plot 600 includes an X-axis indicating an importance score and a Y-axis indicating features. By way of example, plot 600 is presented with respect to a random forest classifier trained for selecting an agent based on optimizing a customer satisfaction score (CSAT), and represents results of an analysis of feature dependency based on prior contact center data showing a relationship between determinant attributes for routing based on CSAT scores (e.g., optimizing for CSAT). The analysis may be performed using any conventional or other data analysis techniques. However, the plot may be generated for other machine learning models and objectives. Machine learning module 130 performs the data analysis and determines the features with the highest importance scores to be used for the machine learning model (e.g., for training, for determining an agent, etc.) since these features are more relevant to predicting or attaining an outcome or objective. In this example, the features of calls offered within service level, prior customer sentiment, and agent skills have the highest importance and may be used by the machine learning model for training and to determine the best agent to be selected for optimizing CSAT. The features may be monitored over time based on historical data and new interactions to dynamically and continuously adjust the feature set used for machine learning models 170 (e.g., for training, for determining an agent, etc.). In addition, any quantity of features of lower importance may be combined to form one or more combined features for use by the machine learning model.

With continued reference to FIGS. 1-6, FIG. 7 is a block diagram of a contact center environment 700 for routing communications based on plural objectives according to an example embodiment. In the example embodiment, a contact center 720 is substantially similar to contact center 120 described above (FIG. 2), and includes communication processing module 122, routing module 124, an application programming interface (API) 726, and communication queue 128 to hold communications for routing. Communication processing module 122 is substantially the same as the communication processing module described above (FIG. 2), and initially receives a communication from user device 110 of a user 105 (e.g., a call, etc.). The communication processing module may obtain information about the user and/or communication. For example, the communication processing module may enable interaction with a user (e.g., via an interactive voice response (IVR) system, etc.), or analyze text of messages to obtain information (e.g. reason for the communication, user information, etc.). The information is provided to routing module 124. The routing module is substantially the same as the routing module described above (FIG. 2), and routes the communication from queue 128 to a contact center agent 145 that can handle the communication. The routing module directs API 726 to send a request to rules module 725. The API is substantially similar to API 126 described above (FIG. 2), and may include a Representational State Transfer (REST) API that makes a REST API call to the rules module. However, any type of API or protocol may be used.

Instead of routing based only on the machine learning models, contact center 720 may switch between dynamic (machine learning) and static (or preconfigured) rules based on certain administration configurations (e.g., business hours for holiday lists, emergency closures, overflows, outages, etc.). Further, the machine learning models may be used to optimize routing during high call volume periods. Rules module 725 may be included within, or reside on a remote computer system coupled to, contact center 720. The rules module includes a list of preconfigured rules 740 for routing communications. The rules may indicate one or more conditions (e.g., business hours for holiday lists, emergency closures, overflows, outages, high call volume periods, etc.) and a corresponding static list of specified agents for routing of the communication.

Rules module 725 receives the API request, and determines an applicable rule 740 based on occurrence of conditions of a rule. When a rule 740 is identified (e.g., conditions of the rule are satisfied), the static list of specified agents for the conditions is returned. For example, when a rule is identified, a list of the agents specified in the rule is returned to routing module 124. The agents may be ordered or prioritized in the list. Routing module 124 routes the communication from queue 128 to an agent device 140 of an agent 145 based on priority within the list and agent availability (e.g., an available agent with a highest priority in the list, etc.). The agent device may enable communication between agent 145 and corresponding user 105.

When a rule 740 is not identified (e.g., conditions of the rules are not satisfied), rules module 725 forwards the API request to machine learning module 730 to enable determination of an agent by machine learning models (as opposed to rules 740). Machine learning module 730 is substantially similar to machine learning module 130 described above (FIG. 2), and may be included within, or reside on a remote computer system coupled to, contact center 720. The machine learning module includes a machine learning (ML) inference service 732, a continuous learning module 734, and a series of machine learning models 770. The machine learning models are substantially similar to machine learning models 170 described above (FIG. 2), and are each trained for selecting an agent based on optimizing a corresponding objective. By way of example, machine learning models 770 may include a machine learning model for each corresponding objective of customer satisfaction score (CSAT), net promoter score (NPS), customer effort score (CES), handle time, service level percentage, agent skill, and call reason. In other words, a machine learning model selects an agent that produces an optimal score for a corresponding objective from an interaction between the selected agent and user (e.g., an optimal CSAT, NPS, CES, match to agent skill, match to the call reason, etc.). However, any quantity of machine learning models may be used corresponding to any quantity of any desired objectives.

Machine learning inference service 732 is substantially similar to machine learning inference service 132 described above (FIG. 2), processes the API request, and retrieves information of a corresponding machine learning model from database 150 based on user and other information in the API request (e.g., objective, etc.). The machine learning inference service provides an associated feature set to the corresponding machine learning model that produces a list of agents to handle the request in substantially the same manner described above. The agents may be ordered or prioritized in the list based on a confidence or probability of the agent produced by the corresponding machine learning model.

Machine learning models 770 may include any conventional or other machine learning models (e.g., mathematical/statistical, logistic regression, classifiers (e.g., random forest, gradient boosting, linear support vector classifier (SVC), Multinomial Naive Bayes (MNB), etc.), feed-forward, recurrent, convolutional, deep learning, or other neural networks, etc.). By way of example, a neural network may be employed for agent selection in substantially the same manner described above.

In some instances, an objective may desired to be emphasized without compromising other objectives. In an embodiment, low and high watermarks or thresholds for the objectives may be employed. Machine learning module 730 may include a configuration module 750 to dynamically adjust machine learning models 770 (e.g., adjust a feature set, training, etc.) to enable their accuracy to remain above the defined lower watermarks (e.g., or between the low and high watermarks). These thresholds can be used to have a machine learning model automatically adjust to conform to those watermarks. For example, a machine learning model for a corresponding objective may be dynamically adjusted (e.g., adjust a feature set, configuration, additional training or training data, etc.) to maintain an accuracy in the range indicated by the watermarks.

In some instances, agent selection may be desired based on a combination of objectives. The objectives may be weighted to indicate significance. For example, a weighted combination of objectives may include an 80% weight for a customer satisfaction score (CSAT) and a 20% weight for call reason. The weights may be determined for the objectives based on user input, certain thresholds, and/or historical data. The weights are applied to the results of the corresponding machine learning models, which may be expressed as:

$$\text{Final Outcome} = w1 * (\text{model1 outcome}) + w2 * (\text{model2 outcome});$$

where w1 is a weight for a first objective and 0<w1<1, w2 is a weight for a second objective and 0<w2<1, model1 outcome is a result from a machine learning model for the first objective, model2 outcome is a result from a second machine learning model for the second objective, and w1+w2=1.0.

In the above example, the first objective is a customer satisfaction score (CSAT) with a weight, w1=0.8, the first machine learning model is trained to select an agent based on optimizing CSAT, the second objective is call reason with a weight, w2=0.2, and the second machine learning model is trained to select an agent based on optimizing a match to the call reason. The final outcome indicates the weighted score for an agent from results of the machine learning models (e.g., weights applied to probabilities for the determined agent from the machine learning models), where the resulting list of agents is selected based on the weighted scores (e.g., agents with the highest weighted scores, etc.). This approach optimizes for a collection of objectives or outcomes chosen by an administrator or other user.

In an embodiment, machine learning inference service 732 processes the API request, and retrieves information of the machine learning models corresponding to the desired objectives from database 150 based on user and other information in the API request (e.g., objectives, weights, etc.). The weights are applied to results (e.g., probabilities for agents, etc.) produced by corresponding machine learning models and combined to produce weighted scores for the agents as described above. The agents may be ordered or prioritized in a list based on the weighted scores.

Rules module 725 receives the list of agents from machine learning inference service 732 and forwards the list to routing module 124 of contact center 720. The routing module routes the communication from queue 128 to an agent device 140 of an agent 145 based on priority within the list and agent availability (e.g., an available agent with a highest priority in the list, etc.). The agent device may enable communication between agent 145 and corresponding user 105.

Continuous learning module 734 is substantially similar to continuous learning module 134 described above (FIG. 2), and continuously trains machine learning models 770 based on historical data (e.g., from post contact/interaction data, customer experience data sources, customer relationship management (CRM) systems, etc.). Further, various feedback may be provided for training (e.g., human feedback, feedback from contact metrics and experience sources, etc.). The continuous learning module updates or replaces a current machine learning model for an objective with a newly trained machine learning model based on improved accuracy. For example, a first portion (e.g., 50%-70%) of a data set may be used for training a machine learning model, a second smaller portion (e.g., 20%-30%) of a data set may used for validating the trained machine learning model, and a third smallest portion (e.g., 10%-20%) of the data set (with new data for the machine learning model) may be used to test the machine learning model and measure performance or accuracy. However, the portions may include any amount of the data set.

Moreover, continuous learning module 734 may determine the features with highest relevance for predicting or attaining an outcome or objective to be used for the machine learning models (e.g., for training, for determining an agent, etc.). The relevance may be determined from historical data (e.g., interactions and outcomes, etc.) in substantially the same manner described above (FIG. 6). The features may be monitored over time based on historical data and new interactions to dynamically and continuously adjust the feature set used for machine learning models 770 (e.g., for training, for determining an agent, etc.).

In addition, continuous learning module 734 may continuously update agent attributes (e.g., skill, toxicity, burnout scores, etc.) using a machine learning model accuracy. In this case, the machine learning model involves a threshold level of completed matches to accurately provide a recommendation for an update.

With continued reference to FIGS. 1-7, FIG. 8 illustrates a flowchart of a method 800 for routing communications based on plural objectives according to an example embodiment. Initially, contact center 720 receives a communication from user device 110 of user 105 (e.g., a call, etc.) at operation 805. The communication is processed to obtain information about the user and/or communication, and may be provided to queue 128. For example, the communication processing module may enable interaction with a user (e.g., via an interactive voice response (IVR) system, etc.), or analyze text of messages to obtain information (e.g. reason for the communication, user information, etc.). The information is provided to routing module 124 that directs API 726 to send a request to rules module 725.

Rules module 725 receives the API request, and determines a presence of an applicable rule 740 based on occurrence of conditions of a rule. When a rule is identified (e.g., conditions of the rule are satisfied) as determined at operation 810, a static list of agents specified in the rule for the conditions is determined at operation 815. The agents may be ordered or prioritized in the list.

When a rule is not identified (e.g., conditions of the rules are not satisfied) as determined at operation 810, rules module 725 forwards the API request to machine learning module 730 to enable determination of an agent by machine learning models (as opposed to rules). Machine learning module 730 includes a series of machine learning models 770 each trained for selecting an agent based on optimizing a corresponding objective. Machine learning inference service 732 of the machine learning module identifies one or more machine learning models for selection of agents based on user and other information in the API request (e.g., objectives, etc.) at operation 820. The information for the identified machine learning models is retrieved from database 150, and the machine learning inference service provides a corresponding feature set to the identified machine learning models that produce a list of agents to handle the request at operation 825. The agents may be ordered or prioritized in the list based on a confidence or probability of the agent produced by the identified machine learning models.

For example, the API request may indicate a desired objective, where a machine learning model corresponding to the objective is used to determine the list of agents in substantially the same manner described above. In another example, agent selection may be desired based on a weighted combination of objectives. In this case, results from each machine learning model corresponding to one of the objectives may be weighted and combined to produce an overall result for an agent. The list of agents may be determined based on the overall scores in substantially the same manner described above.

Rules module 725 receives the list of agents from machine learning inference service 732 and forwards the list to routing module 124 of contact center 720.

Routing module 124 receives the list of agents (determined from rules at operation 815 or machine learning at operation 825), and routes the communication from queue 128 to an agent device 140 of an agent 145 at operation 830 based on priority within the list and agent availability (e.g., an available agent with a highest priority in the list, etc.). The agent device may enable communication between the agent and corresponding user. Once the interaction between the agent and corresponding user is completed, feedback may be received pertaining to the interaction at operation 835. The feedback may include agent, supervisor, and customer feedback (e.g., customer satisfaction/loyalty/effort scores or ratings, call metrics, etc.). The feedback is provided to continuously train machine learning models 770 (at operation 840).

Continuous learning module 734 of machine learning module 730 continuously updates and/or trains machine learning models 770 in substantially the same manner described above. In particular, a series of different types of machine learning models may be generated, updated, and/or trained for each corresponding objective at operation 840 based on historical data (e.g., from post contact/interaction data, customer experience data sources, customer relationship management (CRM) systems, etc.). Further, various feedback may be provided for training (e.g., human feedback, feedback from contact metrics and experience sources, etc.).

Moreover, continuous learning module 734 may determine the features with highest relevance for predicting an outcome or objective to be used for the machine learning models (e.g., for training, for determining an agent, etc.). The relevance may be determined from historical data (e.g., interactions and outcomes, etc.) in substantially the same manner described above (FIG. 6). The features may be monitored over time based on historical data and new interactions to dynamically and continuously adjust the feature set used for machine learning models 770 (e.g., for training, for determining an agent, etc.).

Moreover, continuous learning module 734 may continuously update agent attributes (e.g., skill, toxicity, burnout scores, etc.) using the machine learning model accuracy. In this case, the machine learning model involves a threshold level of completed matches for an update.

In addition, an objective may be desired to be emphasized without compromising other objectives. Configuration module 750 may dynamically adjust the machine learning models 770 (e.g., adjust a feature set, training, etc.) to enable their accuracy to remain above defined lower watermarks (e.g., or between defined low and high watermarks). These watermarks or thresholds can be used to have a machine learning model automatically adjust to conform to those watermarks. For example, a machine learning model for a corresponding objective may be dynamically adjusted (e.g., adjust a feature set, configuration, additional training or training data, etc.) to maintain an accuracy in the range indicated by the watermarks.

Performance of the different types of machine learning models and a currently used machine learning model are measured, and a best machine learning model for each objective is selected based on testing results (e.g., greatest accuracy, etc.) at operation 845 in substantially the same manner described above (FIG. 4). The continuous learning module updates or replaces a current machine learning model for an objective with a newly trained machine learning model based on improved accuracy. For example, a first portion (e.g., 50%-70%) of a data set may be used for training a machine learning model, a second smaller portion (e.g., 20%-30%) of a data set may used for validating the trained machine learning model, and a third smallest portion (e.g., 10%-20%) of the data set (with new data for the machine learning model) may be used to test the machine learning model and measure performance or accuracy. However, the portions may include any amount of the data set.

For example, when a current machine learning model for an objective experiences a reduction in performance or accuracy (e.g., indicating the current machine learning model may no longer be able to accommodate emerging patterns in the data, etc.), a newly trained machine learning model for the objective having greater accuracy may replace the current machine learning model. This enables the machine learning models to remain updated as new data patterns emerge (for selection at operation 820).

The above process repeats from operations 805 and 840 (e.g., the machine learning is performed continuously and during agent selection, etc.) until no further communications are present for processing as determined at operation 850.

FIG. 9 is a flowchart of an example method 900 for routing communications. At operation 905, one or more machine learning models of at least one processor determine an agent of a communication center to receive a communication from a user according to one or more objectives that optimize a corresponding metric from interaction of the user and the agent. Features for training the one or more machine learning models are dynamically selected based on relevance of the features to attaining the one or more objectives. At operation 910, the at least one processor routes the communication to the agent of the communication center.

Figure 10:
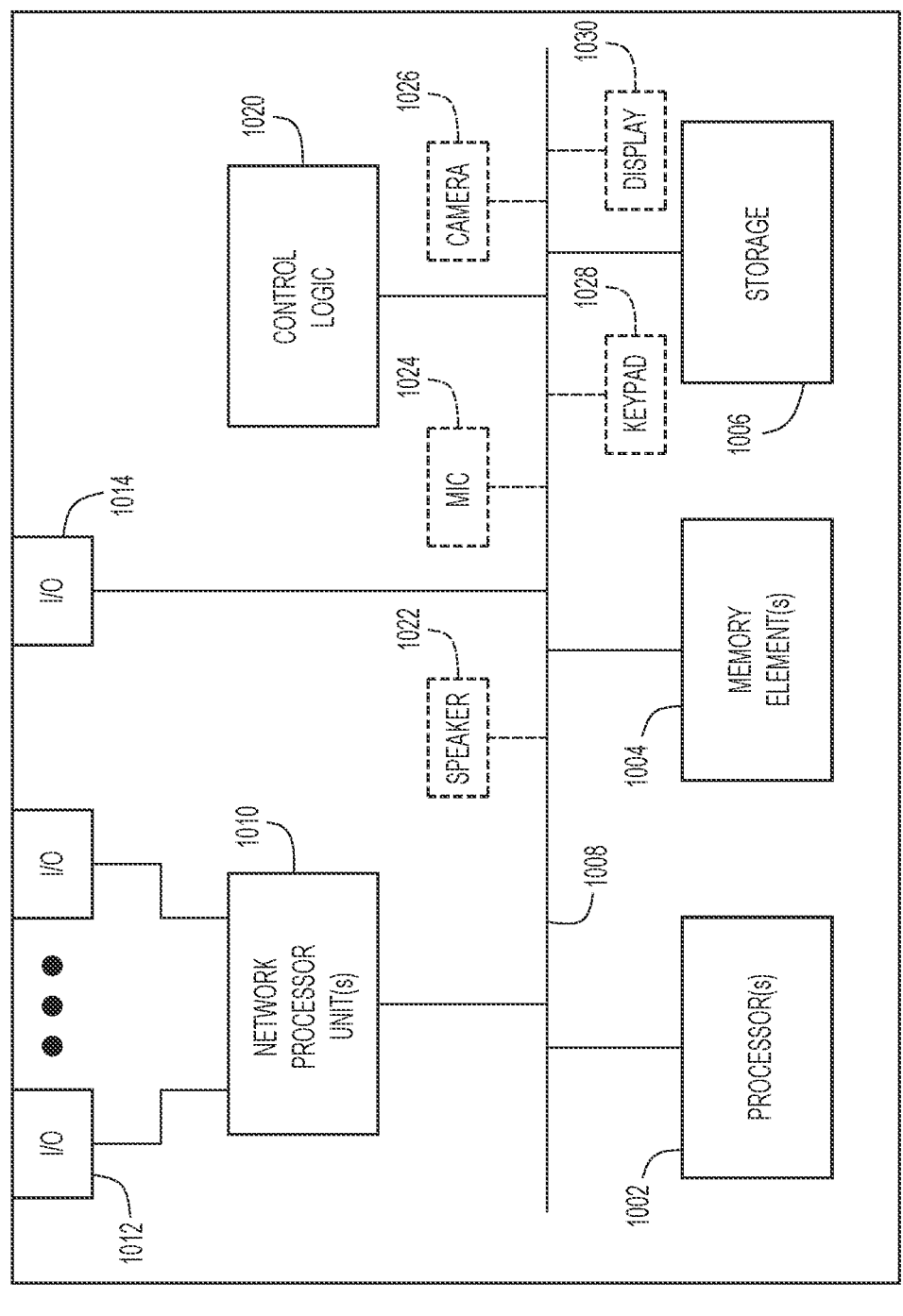
FIG. 10 illustrates a hardware block diagram of a computing device configured to perform functions associated with routing communications as discussed herein, according to an example embodiment.

Referring to FIG. 10, FIG. 10 illustrates a hardware block diagram of a computing device 1000 that may perform functions associated with operations discussed herein in connection with the techniques depicted in FIGS. 1-9. In various embodiments, a computing device or apparatus, such as computing device 1000 or any combination of computing devices 1000, may be configured as any device entity/entities (e.g., computer devices, supervisor or other server systems, endpoint devices, etc.) as discussed for the techniques depicted in connection with FIGS. 1-9 in order to perform operations of the various techniques discussed herein.

In at least one embodiment, computing device 1000 may be any apparatus that may include one or more processor(s) 1002, one or more memory element(s) 1004, storage 1006, a bus 1008, one or more network processor unit(s) 1010 interconnected with one or more network input/output (I/O) interface(s) 1012, one or more I/O interface(s) 1014, and control logic 1020. In various embodiments, instructions associated with logic for computing device 1000 can overlap in any manner and are not limited to the specific allocation of instructions and/or operations described herein.

In at least one embodiment, processor(s) 1002 is/are at least one hardware processor configured to execute various tasks, operations and/or functions for computing device 1000 as described herein according to software and/or instructions configured for computing device 1000. Processor(s) 1002 (e.g., a hardware processor) can execute any type of instructions associated with data to achieve the operations detailed herein. In one example, processor(s) 1002 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1004 and/or storage 1006 is/are configured to store data, information, software, and/or instructions associated with computing device 1000, and/or logic configured for memory element(s) 1004 and/or storage 1006. For example, any logic described herein (e.g., control logic 1020) can, in various embodiments, be stored for computing device 1000 using any combination of memory element(s) 1004 and/or storage 1006. Note that in some embodiments, storage 1006 can be consolidated with memory elements 1004 (or vice versa), or can overlap/exist in any other suitable manner.

In at least one embodiment, bus 1008 can be configured as an interface that enables one or more elements of computing device 1000 to communicate in order to exchange information and/or data. Bus 1008 can be implemented with any architecture designed for passing control, data and/or information between processors, memory elements/storage, peripheral devices, and/or any other hardware and/or software components that may be configured for computing device 1000. In at least one embodiment, bus 1008 may be implemented as a fast kernel-hosted interconnect, potentially using shared memory between processes (e.g., logic), which can enable efficient communication paths between the processes.

In various embodiments, network processor unit(s) 1010 may enable communication between computing device 1000 and other systems, entities, etc., via network I/O interface(s) 1012 to facilitate operations discussed for various embodiments described herein. In various embodiments, network processor unit(s) 1010 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/ modem(s), and/or other similar network interface driver(s) and/or controller(s) now known or hereafter developed to enable communications between computing device 1000 and other systems, entities, etc. to facilitate operations for various embodiments described herein. In various embodiments, network I/O interface(s) 1012 can be configured as one or more Ethernet port(s), Fibre Channel ports, any other I/O port(s), and/or antenna(s)/antenna array(s) now known or hereafter developed. Thus, the network processor unit(s) 1010 and/or network I/O interfaces 1012 may include suitable interfaces for receiving, transmitting, and/or otherwise communicating data and/or information in a network environment.

I/O interface(s) 1014 allow for input and output of data and/or information with other entities that may be connected to computing device 1000. For example, I/O interface(s) 1014 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

With respect to certain entities (e.g., computer device, endpoint device, user device, agent device, etc.), computing device 1000 may further include, or be coupled to, an audio speaker 1022 to convey sound, microphone or other sound sensing device 1024, camera or image capture device 1026, a keypad or keyboard 1028 to enter information (e.g., alphanumeric information, etc.), and/or a touch screen or other display 1030. These items may be coupled to bus 1008 or I/O interface(s) 1014 to transfer data with other elements of computing device 1000.

In various embodiments, control logic 1020 can include instructions that, when executed, cause processor(s) 1002 to perform operations, which can include, but not be limited to, providing overall control operations of computing device 1000; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

Present embodiments may provide various technical and other advantages. In an embodiment, the machine learning models may be dynamically and constantly updated (e.g., trained, replaced, etc.) as users interact with selected agents. For example, feedback from user and agent interactions may be used to update or train the machine learning models with new or different training data (e.g., derived from attributes of the interactions, etc.) and/or dynamically adjust (e.g., expand, modify, etc.) a feature set of the machine learning models to improve accuracy. Thus, the machine learning models may continuously evolve (or be trained) to learn characteristics of users, agents, and corresponding interactions to improve routing (e.g., identify a best destination/agent with lowest wait or idle time, etc.).

The programs and software described herein may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other stores or repositories, queue, etc.). The data transmitted between device entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., graphical user interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, datacenters, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software. These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flowcharts and diagrams illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client, server, and other processing devices or systems, and/or any other intermediary processing devices. The software and/or algorithms described above and illustrated in the flowcharts and diagrams may be modified in any manner that accomplishes the functions described herein. In addition, the functions in the flowcharts, diagrams, or description may be performed in any order that accomplishes a desired operation.

The networks of present embodiments may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

In various embodiments, any device entity or apparatus as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more device entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 1004 and/or storage 1006 can store data, software, code, instructions (e.g., processor instructions), logic, parameters, combinations thereof, and/or the like used for operations described herein. This includes memory elements 1004 and/or storage 1006 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, any device entity or apparatus for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four device entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more device entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X. Y or Z', 'one or more of X, Y and Z', 'one or more of X. Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In one form, a method is provided. The method comprises: determining, via one or more machine learning models of at least one processor, an agent of a communication center to receive a communication from a user according to one or more objectives that optimize a corresponding metric from interaction of the user and the agent, wherein features for training the one or more machine learning models are dynamically selected based on relevance of the features to attaining the one or more objectives; and routing, via the at least one processor, the communication to the agent of the communication center.

In one example, the one or more objectives are selected from a plurality of objectives by an administrator.

In one example the method further comprises constantly training the one or more machine learning models, via the at least one processor, based on feedback from interactions between users and agents of the communication center.

In one example, the method further comprises: training, via the at least one processor, a plurality of different types of machine learning models for a corresponding objective; selecting, via the at least one processor, one of the plurality of different types of machine learning models having greatest accuracy as a new machine learning model; and replacing, via the at least one processor, a machine learning model of the one or more machine learning models associated with the corresponding objective with the new machine learning model in response to the new machine learning model having greater accuracy than the machine learning model associated with the corresponding objective.

In one example, the method further comprises determining the agent, via the at least one processor, based on preconfigured rules in response to occurrence of conditions specified in the preconfigured rules.

In one example, the one or more machine learning models include a plurality of machine learning models trained for associated objectives, and the method further comprises: determining results by each of the plurality of machine learning models; applying, via the at least one processor, weights for the associated objectives to the results of the plurality of machine learning models to produce weighted results; and determining, via the at least one processor, the agent based on combining the weighted results.

In one example, the one or more machine learning models include a plurality of machine learning models trained for associated objectives, and the method further comprises adjusting, via the at least one processor, the plurality of machine learning models to maintain accuracy of each of the plurality of machine learning models for the associated objectives above a threshold.

In another form, an apparatus is provided. The apparatus comprises: a communication center comprising one or more processors, wherein the one or more processors are configured to: determine, via one or more machine learning models, an agent of the communication center to receive a communication from a user according to one or more objectives that optimize a corresponding metric from interaction of the user and the agent, wherein features for training the one or more machine learning models are dynamically selected based on relevance of the features to attaining the one or more objectives; and route the communication to the agent of the communication center.

In another form, one or more non-transitory computer readable storage media are provided. The non-transitory computer readable storage media are encoded with processing instructions that, when executed by one or more processors, cause the one or more processors to: determine, via one or more machine learning models, an agent of a communication center to receive a communication from a user according to one or more objectives that optimize a corresponding metric from interaction of the user and the agent, wherein features for training the one or more machine learning models are dynamically selected based on relevance of the features to attaining the one or more objectives; and route the communication to the agent of the communication center.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
  determining, via at least one processor, an applicable rule for routing a first communication from among preconfigured rules based on occurrence of conditions specified in the preconfigured rules;
  routing, via the at least one processor, the first communication to a first agent of a communication center based on one or more agents indicated by the applicable rule;
  determining, via the at least one processor, an absence of a rule in the preconfigured rules for a second communication;
  determining, via a plurality of machine learning models of the at least one processor, second agents of the communication center to receive the second communication according to a plurality of objectives that each optimize a corresponding metric from agent interaction, wherein the plurality of machine learning models are each trained for an associated objective and further determine probabilities representing confidences for the second agents;
  producing, via the at least one processor, scores for the second agents by applying a weight for the associated objective of a corresponding machine learning model to a probability for a corresponding second agent determined by the corresponding machine learning model;
  determining, via the at least one processor, a second agent from among the second agents to receive the second communication based on the scores for the second agents;
  routing, via the at least one processor, the second communication to the second agent of the communication center;
  training, via the at least one processor, a plurality of different types of machine learning models for a corresponding objective, wherein the plurality of different types of machine learning models include a random forest classifier, a linear support vector classifier, a Multinomial Naive Bayes model, a logistic regression model, and a gradient boosting classifier; and
  replacing, via the at least one processor, a machine learning model of a first type of the plurality of machine learning models associated with the corresponding objective with a new machine learning model of a second different type selected from the plurality of different types of machine learning models and having greater accuracy than the machine learning model of the first type.

2. The method of claim 1, wherein the plurality of objectives is selected by an administrator.

3. The method of claim 1, further comprising:
  constantly training the plurality of machine learning models, via the at least one processor, based on feedback from interactions between users and agents of the communication center.

4. The method of claim 1,
  wherein a sum of weights for associated objectives of the plurality of machine learning models equals one.

5. The method of claim 1, wherein the one or more agents indicated by the applicable rule are prioritized.

6. The method of claim 1, further comprising:
  determining, via the at least one processor, the second agent based on a highest score.

7. The method of claim 1, further comprising:
  adjusting, via the at least one processor, the plurality of machine learning models to maintain accuracy of each of the plurality of machine learning models for associated objectives above a threshold.

8. An apparatus comprising:
  a communication center comprising one or more processors, wherein the one or more processors are configured to perform operations including:
  determining a rule for routing a communication from among preconfigured rules based on occurrence of conditions specified in the preconfigured rules;
  in response to a presence of the rule in the preconfigured rules, determining an agent of the communication center to receive the communication based on one or more agents indicated by the rule;
  in response to an absence of the rule in the preconfigured rules:

determining, via a plurality of machine learning models, a plurality of agents of the communication center to receive the communication according to a plurality of objectives that each optimize a corresponding metric from agent interaction, wherein the plurality of machine learning models are each trained for an associated objective and further determine probabilities representing confidences for the plurality of agents;

producing scores for the plurality of agents by applying a weight for the associated objective of a corresponding machine learning model to a probability for a corresponding agent determined by the corresponding machine learning model; and determining the agent from among the plurality of agents to receive the communication based on the scores for the plurality of agents;

routing the communication to the agent of the communication center;

training a plurality of different types of machine learning models for a corresponding objective, wherein the plurality of different types of machine learning models include a random forest classifier, a linear support vector classifier, a Multinomial Naive Bayes model, a logistic regression model, and a gradient boosting classifier; and replacing a machine learning model of a first type of the plurality of machine learning models associated with the corresponding objective with a new machine learning model of a second different type selected from the plurality of different types of machine learning models and having greater accuracy than the machine learning model of the first type.

9. The apparatus of claim 8, wherein the one or more processors are configured to perform further operations including:

constantly training the plurality of machine learning models based on feedback from interactions between users and agents of the communication center.

10. The apparatus of claim 8, wherein a sum of weights for associated objectives of the plurality of machine learning models equals one.

11. The apparatus of claim 8, wherein the one or more agents indicated by the rule are prioritized.

12. The apparatus of claim 8, wherein the one or more processors are configured to perform further operations in response to the absence of the rule including:

determining the agent based on a highest score.

13. The apparatus of claim 8, wherein the one or more processors are configured to perform further operations including:

adjusting the plurality of machine learning models to maintain accuracy of each of the plurality of machine learning models for associated objectives above a threshold.

14. One or more non-transitory computer readable storage media encoded with processing instructions that, when executed by one or more processors, cause the one or more processors to perform operations including:

determining a rule for routing a communication from among preconfigured rules based on occurrence of conditions specified in the preconfigured rules;

in response to a presence of the rule in the preconfigured rules, determining an agent of a communication center to receive the communication based on one or more agents indicated by the rule;

in response to an absence of the rule in the preconfigured rules:

determining, via a plurality of machine learning models, a plurality of agents of the communication center to receive the communication according to a plurality of objectives that each optimize a corresponding metric from agent interaction, wherein the plurality of machine learning models are each trained for an associated objective and further determine probabilities representing confidences for the plurality of agents;

producing scores for the plurality of agents by applying a weight for the associated objective of a corresponding machine learning model to a probability for a corresponding agent determined by the corresponding machine learning model; and determining the agent from among the plurality of agents to receive the communication based on the scores for the plurality of agents;

routing the communication to the agent of the communication center;

training a plurality of different types of machine learning models for a corresponding objective, wherein the plurality of different types of machine learning models include a random forest classifier, a linear support vector classifier, a Multinomial Naive Bayes model, a logistic regression model, and a gradient boosting classifier; and replacing a machine learning model of a first type of the plurality of machine learning models associated with the corresponding objective with a new machine learning model of a second different type selected from the plurality of different types of machine learning models and having greater accuracy than the machine learning model of the first type.

15. The one or more non-transitory computer readable storage media of claim 14, wherein the plurality of objectives is selected by an administrator.

16. The one or more non-transitory computer readable storage media of claim 14, wherein the processing instructions cause the one or more processors to perform further operations including:

constantly training the plurality of machine learning models based on feedback from interactions between users and agents of the communication center.

17. The one or more non-transitory computer readable storage media of claim 14, wherein a sum of weights for associated objectives of the plurality of machine learning models equals one.

18. The one or more non-transitory computer readable storage media of claim 14, wherein the one or more agents indicated by the rule are prioritized.

19. The one or more non-transitory computer readable storage media of claim 14, wherein the processing instructions cause the one or more processors to perform further operations in response to the absence of the rule including:

determining the agent based on a highest score.

20. The one or more non-transitory computer readable storage media of claim 14, wherein the processing instructions cause the one or more processors to perform further operations including:

adjusting the plurality of machine learning models to maintain accuracy of each of the plurality of machine learning models for associated objectives above a threshold.

* * * * *